(12) United States Patent
Chadi

(10) Patent No.: US 10,977,797 B2
(45) Date of Patent: Apr. 13, 2021

(54) SYSTEM AND METHODS FOR FULLY AUTOMATED DATA ANALYSIS, REPORTING AND QUANTIFICATION FOR MEDICAL AND GENERAL DIAGNOSIS, AND FOR EDGE DETECTION IN DIGITIZED IMAGES

(71) Applicant: EYES LTD, Bet Shemesh (IL)

(72) Inventor: Benjamin H. Chadi, Great Neck, NY (US)

(73) Assignee: EYES LTD., Bet Shemesh (IL)

( * ) Notice: Subject to any disclaimer, the term of this patent is extended or adjusted under 35 U.S.C. 154(b) by 20 days.

(21) Appl. No.: 16/469,390

(22) PCT Filed: Dec. 13, 2017

(86) PCT No.: PCT/IL2017/051344
§ 371 (c)(1),
(2) Date: Jun. 13, 2019

(87) PCT Pub. No.: WO2018/109764
PCT Pub. Date: Jun. 21, 2018

(65) Prior Publication Data
US 2020/0098110 A1  Mar. 26, 2020

Related U.S. Application Data

(60) Provisional application No. 62/433,815, filed on Dec. 14, 2016.

(51) Int. Cl.
*G06T 7/13* (2017.01)
*G06T 7/162* (2017.01)
*G06T 7/194* (2017.01)

(52) U.S. Cl.
CPC ............... *G06T 7/13* (2017.01); *G06T 7/162* (2017.01); *G06T 7/194* (2017.01);
(Continued)

(58) Field of Classification Search
CPC .......... G06T 7/13; G06T 7/162; G06T 7/194; G06T 2207/20032; G06T 2207/20072; G06T 2207/30048
See application file for complete search history.

(56) References Cited

U.S. PATENT DOCUMENTS 6,094,508 A * 7/2000 Acharya ................... G06T 7/12
382/199
7,742,629 B2 * 6/2010 Zarkh ...................... G06T 7/564
382/128

(Continued)

FOREIGN PATENT DOCUMENTS

WO   2016001223   1/2016
WO   2017168424   10/2017

OTHER PUBLICATIONS

International Search Report and Written Opinion, International Application No. PCT/IL2017/051344, dated Mar. 28, 2018.

*Primary Examiner* — Xuemei G Chen
(74) *Attorney, Agent, or Firm* — The Roy Gross Law Firm, LLC; Roy Gross

(57) ABSTRACT

A method of detecting an edge within digitized images, said method comprising steps of: (a) obtaining said image in a digital form; (b) building a 3D graph of intensity distribution within said image; (c) finding Regions of Interest ROI in the image and subtracting out the background; (d) establishing edge lines within said image; establishing a resultant edge line for each ROI by averaging or maximizing the set of independently obtained edge lines corresponding to said plurality of criteria but that differ from each other by a margin increasing with a predetermined increment; and (f) generating at least one report presenting the quantitative and/or qualitative parameters in a form of accurate quantitative measurements and qualitative inferences regarding (Continued)

medical and general diagnosis of the images and patients utilizing one or more output modules.

20 Claims, 1 Drawing Sheet

(52) U.S. Cl.
CPC ............... *G06T 2207/20032* (2013.01); *G06T 2207/20072* (2013.01); *G06T 2207/30048* (2013.01)

(56) References Cited

U.S. PATENT DOCUMENTS

| | | | | |
|---|---|---|---|---|
| 8,126,232 | B2* | 2/2012 | Dikici | G06T 7/162 382/128 |
| 8,150,103 | B2* | 4/2012 | Zhang | G08B 13/19606 382/103 |
| 8,391,612 | B2* | 3/2013 | Natroshvili | G06T 7/13 382/199 |
| 8,644,624 | B2* | 2/2014 | Tao | G06K 9/00684 382/224 |
| 9,779,546 | B2* | 10/2017 | Hunt | G01B 11/00 |
| 10,588,605 | B2* | 3/2020 | Samset | A61B 8/06 |
| 2011/0222779 | A1* | 9/2011 | Karanam | G06T 7/13 382/199 |
| 2015/0125039 | A1* | 5/2015 | Wu | G06K 9/4604 382/104 |
| 2017/0098310 | A1 | 4/2017 | Chefd'hotel et al. | |
| 2017/0236258 | A1* | 8/2017 | Hsu | G06T 7/13 382/260 |
| 2017/0294017 | A1* | 10/2017 | Yuan | G06T 7/0012 |
| 2019/0392585 | A1* | 12/2019 | Meng | G06T 7/13 |

* cited by examiner

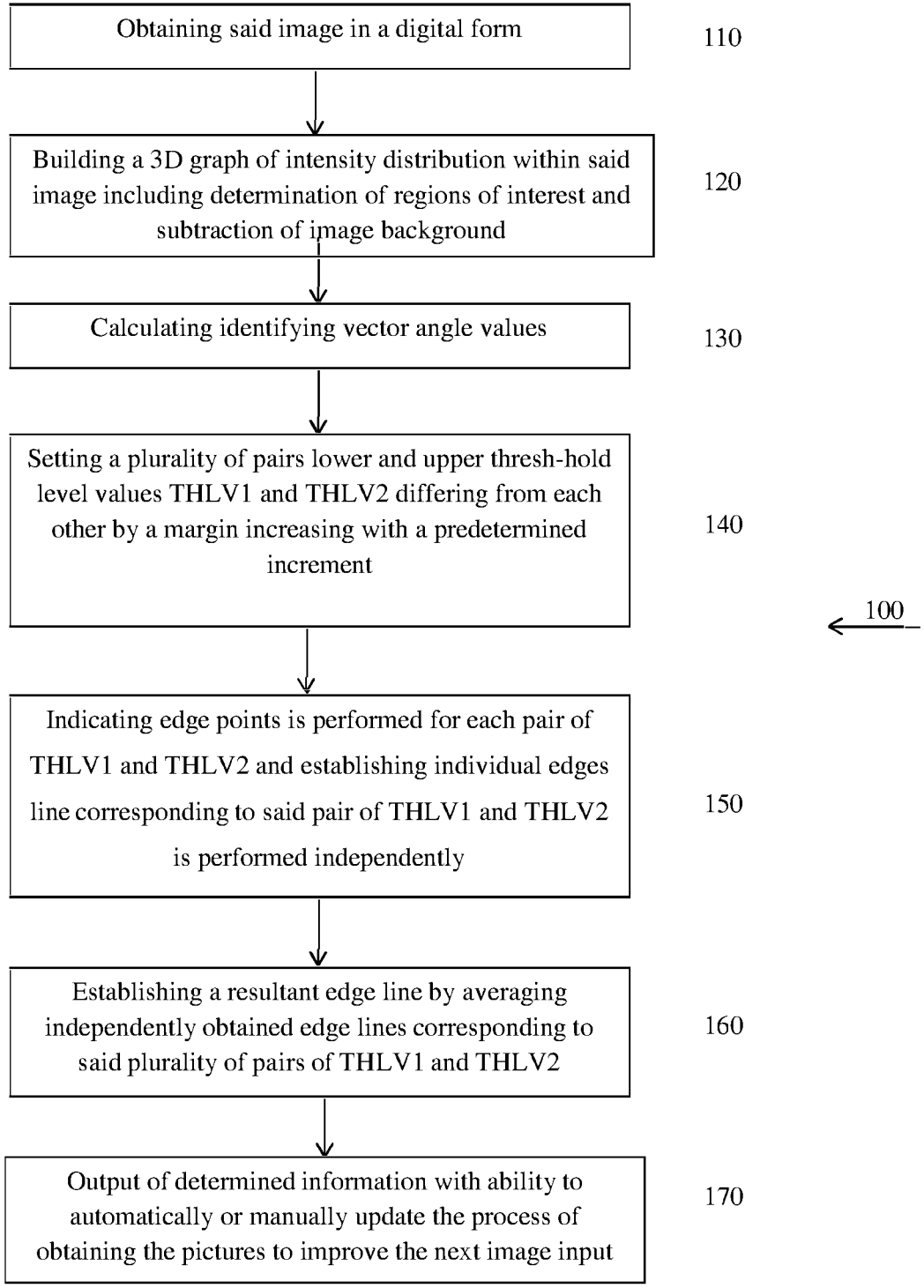

SYSTEM AND METHODS FOR FULLY AUTOMATED DATA ANALYSIS, REPORTING AND QUANTIFICATION FOR MEDICAL AND GENERAL DIAGNOSIS, AND FOR EDGE DETECTION IN DIGITIZED IMAGES

RELATED APPLICATIONS

This application is a National Phase of PCT Patent Application No. PCT/IL2017/051344 having International filing date of Dec. 13, 2017, which claims the benefit of priority of U.S. Provisional Application No. 62/433,815 filed on Dec. 14, 2016. The contents of the above applications are all incorporated by reference as if fully set forth herein in their entirety.

FIELD OF THE INVENTION

The present invention relates generally to the field of image assessment and analysis. More specifically, the present invention relates to edge detecting in digitized images.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

Scientific endeavors generally require precise and accurate quantification to determine results. In medicine, and in the field of cardiology in particular, the results obtained from various tests are used in further decision-making regarding the patient including accurate diagnosis and treatment. Many tests, especially those involving imaging, provide results that require great skill to analyze by a trained expert or specialist. Due to the huge amount of information presented in an image and the lack of accurate fully automated systems for analysis, the field of medicine is frequently left to semi-quantitation (e.g., grade on a 1 to 4 scale). While this may be adequate for many purposes, observer bias, lack of reproducibility, and lack of the ability to be precise often results in the need for more testing to try to be certain of the diagnosis, or painstaking effort by the physician to make sure the treatment is given in the effective regions (e.g., that the proper location on the field of image is treated by X-rays, etc.). The ability to perform rapid and accurate quantification using computer-assisted image analysis can be a great aid in these fields.

Currently there have been great limitations in the full automation of image analysis. There are edge-detection system and methods available that look for a general change in the picture but generally require noise subtraction and input from a user to focus on the areas of interest or from an encyclopedic database to compare the image to in order to identify or delimit the object of interest in the image. The edges detected are generally based on first and second differentiation and are binary (edge present/absent) but not qualitative (do not reflect information about different types of edges present). Users of current processes need frequent and direct operator input to effectuate an analysis.

None of the current technologies and prior art, taken alone or in combination, address nor provide a utility solution for fully automated diagnostic data analysis and image quality assessment based on the extraction of predefined parameters from the input of data to be used for further reporting as accurate quantitative measurements and qualitative inferences regarding medical and general diagnosis of patients.

Specific uses and applications of this process include the field of coronary angiography and echocardiography. The raw images obtained in these arts including cineangiograms of the coronary arteries and echo images of the cardiac chamber walls until presently have not readily been amenable to accurate fully automated analysis of artery caliber (diameter along its length to evaluate amount of stenosis) or chamber dimensions and wall thickness.

In coronary angiography until present the cardiologist has had to estimate the percent stenosis along the length of the artery as revealed by the gold standard coronary angiogram (luminogram) or by other techniques including intravascular ultrasound or Computerized Tomographic (CT) scan. However, actual automation of this analysis is burdensome and currently has been inaccurate and therefore unreliable. Using the new detection methods inside a larger method of straightening the artery so that perpendicular cuts are obtained for measurement is providing the ability for both a fully automated and a more accurate analysis of the whole length of the artery.

In echocardiography field, there is currently no fully automated method of measuring cardiac chamber borders and dimensions. The input of the technologist is required in multiple steps of the image analysis. The new method is being developed to enable fully automated chamber measurements and wall thickness analyses and ejection fraction calculation. This would enable accurate noninvasive hemodynamic and cardiac output determinations.

Furthermore, great promise is expected in the field of artificial vision. By comparing two pictures temporally or side-by-side, with the fine resolution and discriminating abilities of the new method, the distances and dimensions of objects will be quickly amenable to calculation. By efficiently and automatically determining the shape and size of the object, automated identification should be greatly improved.

Further uses include the field of CT and MRI (magnetic resonance imaging) and ultrasound scans. The ability to accurately automatically measure chamber edges is expected to allow for automated analysis of normal and abnormal and for generation and comparison to encyclopedic database for further refinement of the art and science besides improving diagnosis and treatment for each individual patient. Another use would be for automated identification and marking of an organ edge for radiation therapy, for example.

WO2017168424 discloses a method of analyzing and assessing an image comprises the steps of: (a) obtaining said image in a digital form; (b) processing said image; and (c) establishing at least one edge line within said image. The step of processing said image further includes: (a) building a 3D graph of intensity distribution within said image; (b) calculating identifying vector angle values (IVAVs); said angles adjoin to points of said 3D intensity distribution graph which correspond to individual pixels of said image; said angles lie in a plane defined by an intensity axis of said image; (c) setting a range of lower and upper thresh-hold level values (THLV1 and THLV2) between which edge points are indicatable; and (d) indicating edge points according to said THLV1 and THLV2.

Accuracy of edge detection largely depends on the set THLV1 and THLV2 values. There is a long-felt and unmet need for a method and a system where dependence of a position of an edge detected in grayscale images is neutralized and made independent of specific absolute values of the grayscale (and specific threshold THLV values).

SUMMARY OF THE INVENTION

It is hence one object of the invention to disclose a method of detecting an edge within digitized images. The aforesaid method comprises steps of: (a) obtaining said image in a digital form; (b) building a 3D graph of intensity distribution within said image; (c) calculating identifying vector angle values (IVAVs); said angles adjoin to points of said 3D intensity distribution graph which correspond to individual pixels of said image; said angles lie in a plane defined by an intensity axis of said image; (d) setting of lower and upper thresh-hold level values (THLV1 and THLV2) between which edge points are indicatable; (e) indicating edge points according to said THLV1 and THLV2; (f) establishing edge lines within said image.

It is a core purpose of the invention to provide the step of setting said THLV1 and THLV2 comprising setting a plurality of pairs of THLV1 and THLV2 differing from each other by a margin increasing with a predetermined increment. The steps of indicating edge points is performed for each pair of THLV1 and THLV2 and establishing individual edges line corresponding to said pair of THLV1 and THLV2 is performed independently. The method further comprises establishing a resultant edge line by averaging or maximizing independently obtained edge lines corresponding to said plurality of pairs of THLV1 and THLV2.

Another object of the invention is to disclose the step of building a 3D graph of intensity distribution within said image comprising subtracting a mathematical function of the background intensity.

A further object of the invention is to disclose the background intensity calculated a function of the average, mean, or median values of a region of interest (ROI, such as the central portion) of said image.

Another object of the invention is to find regions of interest ROI automatically by analyzing the image in the area of expected location of the object of interest to look for an area that meets that definition (e.g., low, high, or other intensity).

A further object of the invention is to disclose the step of building a 3D graph of intensity distribution within said image comprising a sub-step combination of zeroing out certain low intensity signals in addition to applying a median filter.

A further object of the invention is to disclose a system for detecting an edge within digitized images. The aforesaid system comprises: (a) an input unit configured for inputting images to be processed; (b) a processor configured for processing said input image; said processor preprogrammed for executing steps of: (i) obtaining said image in a digital form; (ii) building a 3D graph of intensity distribution within said image; (iii) calculating identifying vector angle values (IVAVs); said angles adjoin to points of said 3D intensity distribution graph which correspond to individual pixels of said image; said angles lie in a plane defined by an intensity axis of said image; (iv) setting of lower and upper thresh-hold level values (THLV1 and THLV2) between which edge points are indicatable; (v) indicating edge points according to said THLV1 and THLV2; (vi) establishing edge lines within said image.

A further object of the invention is to disclose a non-transitory computer-readable medium storing software. The aforesaid medium comprising instructions executable by one or more computers which, upon such execution, cause the one or more computers to perform operations comprises: (a) obtaining said image in a digital form; (b) building a 3D graph of intensity distribution within said image; (c) calculating identifying vector angle values (IVAVs); said angles adjoin to points of said 3D intensity distribution graph which correspond to individual pixels of said image; said angles lie in a plane defined by an intensity axis of said image; (d) setting of lower and upper thresh-hold level values (THLV1 and THLV2) between which edge points are indicatable; (e)

indicating edge points according to said THLV1 and THLV2; (f) establishing edge lines within said image.

Another object of the invention is to compare the found image line with a predetermined feature and if anything stands out to output the information for further action. For example, if in an area (of significant size) of an expected edge, no edge is detected, to report this. And if in another area too many edges are detected or earlier than expected (noise) to report this.

Another object of the invention is to give the image capturing device or input module (such as camera or echo machine) the ability to automatically adapt based on the information given it to increase or decrease the gain in the area where the edge is deficient or excess, respectively to try to improve the detection.

BRIEF DESCRIPTION OF THE PREFERRED EMBODIMENTS

The novel features believed to be characteristics of the invention are set forth in the appended claims. The invention itself, however, as well as the preferred mode of use, further objects and advantages thereof, will best be understood by reference to the following detailed description of illustrative embodiment when read in conjunction with the accompanying drawings, wherein:

FIG. 1 is a flowchart of a method of detecting of an edge in digitized images

DETAILED DESCRIPTION OF THE PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "obtaining", "defining", "processing", "performing," "extracting," "configuring" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices, including integrated circuits down to and including chip level firmware, assembler, and hardware based micro code.

As will be explained in further detail below, the technology described herein relates to generating, storing and using semantic networks and databases to correlate physiological and psychological states of users and/or groups of users using their voice intonation data analysis.

While the invention is susceptible to various modifications and alternative forms, specific embodiments thereof have been shown by way of example in the drawings and the above detailed description. It should be understood, however, that it is not intended to limit the invention to the particular forms disclosed, but on the contrary, the intention is to cover all modifications, equivalents, and alternatives falling within the spirit and scope of the invention as defined by the appended claims.

Reference is now made to FIG. 1 presenting a flowchart of method I 00 of detecting an edge in digitized images. Specifically, the method commences at step 110 with obtaining an image to be processed. In an exemplary embodiment of the present invention, a source of such images can be any medical imaging device (ultrasound, X-ray, MRI and similar). If the image is provided in an analog format, the aforesaid image is digitized at step 120. For this invention, the term "intensity" refers to an actual intensity or its arithmetic function.

Step 120 involves input of or automatically searching for a Region of Interest (ROI) characterized by a predetermined feature within the image. For example, the aforesaid feature to be searched can be based on prior knowledge about the expected depth of the ventricular cavity from the surface of the skin on echocardiographic images (e.g., say 6 cm in an average adult), This type of ROI (ventricular cavity) can be identified on the basis of criterion of a large area of low intensity.

Step 120 of building a 3D graph of intensity distribution can include subtraction (zeroing) of image background. For the present invention, the background intensity is defined as a value measured in a region of interest ROI (such as the central portion) of the image and averaged over a number N of neighboring pixels. Value of N between 4 and 20 is in the scope of the present invention. A certain percentile (e.g., $20^{th}$ percentile) of the value determined in this ROI (such as in the immediately surrounding radius of 100 pixels or 1 cm) is also in the scope of the present invention. A combination of these values or a function of these values may be used (e.g., a sliding scale based on relative intensity of the background with respect to the maximum intensity). In order to improve the signal/noise ratio, any negative numbers are then zeroed out and then another median filter is also applicable to the resultant image to further remove noise before further image processing.

At step 130, identifying vector angle values (IVAVs) are calculated. The aforesaid angles adjoin to points of said 3D intensity distribution graph which correspond to individual pixels of said image. The angles lie in a plane defined by an intensity axis of the image.

An edge line is recognizable when the IVAVs are within the range defined by lower and upper thresh-hold level values (THLV1 and THLV2). It should be appreciated that an obtained trajectory of the obtained edge line depends on a difference between THLV1 and THLV2. The procedures of calculating of IVAVs and setting THLV1 and THLV2 are described in detail in WO2017168424 which is herein incorporated by reference in its entirety. To improve precision of the path-tracing algorithm, instead of the only one pair of THLV1 and THLV2, in the present invention, a plurality of THLV1-THLV2 pairs is set at step 140. Thereat, THLV1 and THLV2 in the specific pairs of the aforesaid plurality differ from each other by a margin increasing with a predetermined increment. Edge points belonging to a plurality of the edge lines defined by each pair of THLV1 and THLV2 are indicated in an independent manner at step 150. And finally, at step 160, a resultant edge line having the improved precision is established by means of averaging or maximizing independently obtained edge lines corresponding to said plurality of pairs of THLV1 and THLV2. The proposed method cardinally decreases dependence of the obtained edge line trajectory on THLV1 and THLV2 per se and the margin between them.

At step 170 the output information may contain the original input data and/or images and/or the calculated results or boundaries (edge lines) obtained superimposed or side-by-side and/or the name and size of the object in the image. The results would be immediately available for the person using the system to have and use as needed, giving him ability to modify the images directly as necessary to improve the results. The ability for direct user input is also provided. For example, the user can be allowed to select a specific area of interest ROI for analysis. And/or a patient's body weight, height, age, and gender that can be entered manually by the operator (e.g., for comparison or standardization with respect to a population range of normal).

According to an alternative embodiment of the present invention, at step 170 the abnormal conditions (lack of the detected edge or low signal/noise ratio) can be reported to the user with instructions on the area of trouble. In this case, an algorithm of automatic image adjustment is initiated. For example, if the edge lacks on the right side of the user, the user could be instructed to increase the right gain. If the image go off the screen on the right, the user can be instructed to move the transducer to the corresponding side. If too many signals are obtained there with edge earlier than expected (based on a predetermined norm) the user could be told to decrease the gain. Or all of these instructions can be programmed automatically so that the imaging machine (e.g. echo or ultrasound device) will automatically adjust the lateral gain to improve edge detection.

In the case of angiograms, obtained edge lines can be automatically output graphical information about each arterial branch and determine and demonstrate location(s) of arterial narrowing, their diameters, and percent stenoses. In the case of echocardiogram the output module can automatically report many determinations including all or some of the following relevant measurements and calculations (including average results and standard deviations): left ventricular volumes actual based on actual 3 dimensional data or calculated based on 2 dimensional data (e.g., by using Simpson's rule for cones) including LV end diastolic volume, LV end systolic volume, LV Ejection Fraction, heart rate, cardiac output, wall thickness, and regional wall motion grade. It may also report chamber volumes for the Right Ventricle and right and left atrium. An RV Ejection Fraction and cardiac output may also be reportable (depending on the view). Likewise sound data can be analyzed for content. For example, heart sound and murmur analysis can be fully automated, very accurate voice processing and recognition can be provided.

A system configured for performing method 100 is also in the scope of the present invention along with a computer-readable medium which stores instructions for doing the same.

In some embodiments, the system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), virtual display, or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™ Apple™ Mac™, iOS™, Android™, Unix™/X-

Windows™, Linux™, etc. The system could be implemented using a web application framework, such as Ruby on Rails.

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of environment tracking systems, data representing user events, virtual elements, etc. can be stored in tables in the RDBMS. The tables can have pre-defined relationships between them. The tables can also have adjuncts associated with the coordinates.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middle-ware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The invention claimed is:

1. A method of detecting an edge within an image in a digital form, said method comprising steps of:
    a. obtaining said image;
    b. building a 3D graph of intensity distribution within said image;
    c. calculating identifying vector angle values (IVAVs); said IVAVS adjoin to points of said 3D intensity distribution graph which correspond to individual pixels of said image; said IVAVs lie in a plane defined by an intensity axis of said image;
    d. setting of lower and upper thresh-hold level values (THLV1 and THLV2) between which edge points are indicatable;
    e. indicating edge points according to said THLV1 and THLV2;
    f. establishing edge lines within said image;
       wherein said step of setting said THLV1 and THLV2 comprises setting a plurality of pairs of THLV1 and THLV2 differing from each other by a margin increasing with a predetermined increment;
       wherein said step of establishing edge lines within said image further comprises sub-steps of indicating edge points performed for each pair of THLV1 and THLV2 and establishing a plurality of edges line corresponding to said plurality of pairs of THLV1 and THLV2 performed in an individual manner;
       wherein said method further comprises establishing a resultant edge line by averaging or maximizing said plurality of edge lines corresponding to said plurality of pairs of THLV1 and THLV2.

2. The method according to claim 1 comprising a step of comparing said resultant edge line with a standard edge trajectory.

3. The method according to claim 2, wherein said step of comparing said resultant edge with a standard edge trajectory comprises searching areas of abnormal conditions and automatically image adjustment.

4. The method according to claim 1, wherein said step of building a 3D graph of intensity distribution within said image comprises subtracting a background intensity.

5. The method according to claim 4, wherein said background intensity is calculated an average value of a region of interest (ROI) or central portion of said image.

6. The method according to claim 5, comprising a step of automatically finding said ROI characterized by a predetermined feature.

7. The method according to claim 1, wherein said step of building a 3D graph of intensity distribution within said image comprises a sub-step selected from the group consisting of zeroing out negative values, applying a median filter and a combination thereof.

8. A system for detecting an edge within an image in a digital form; said system comprising:
   a. an input port for inputting said image to be processed;
   b. a processor configured for processing said image; said processor preprogrammed for executing steps of:
      i. obtaining said image;
      ii. building a 3D graph of intensity distribution within said image;
      iii. calculating identifying vector angle values (IVAVs); said IVAVs adjoin to points of said 3D intensity distribution graph which correspond to individual pixels of said image; said IVAVs lie in a plane defined by an intensity axis of said image;
      iv. setting of lower and upper thresh-hold level values (THLV1 and THLV2) between which edge points are indicatable;
      v. indicating edge points according to said THLV1 and THLV2;
      vi. establishing edge lines within said image;
   c. a display for presenting said established edge lines;
   wherein said step of setting said THLV1 and THLV2 comprises setting a plurality of pairs THLV1 and THLV2 differing from each other by a margin increasing with a predetermined increment;
   wherein said step of establishing edge lines within said image further comprises sub-steps of indicating edge points performed for each pair of THLV1 and THLV2 and establishing a plurality of edges line corresponding to said plurality of pairs of THLV1 and THLV2 performed in an individual manner;
   wherein said system further comprises establishing a resultant edge line by averaging or maximizing said plurality of edge lines corresponding to said plurality of pairs of THLV1 and THLV2.

9. The system according to claim 8 comprising a step of comparing said resultant edge line with a standard edge trajectory.

10. The system according to claim 9, wherein said step of comparing said resultant edge with a standard edge trajectory comprises searching areas of abnormal conditions and automatically image adjustment.

11. The system according to claim 8, wherein said step of building a 3D graph of intensity distribution within said image comprises subtracting a background intensity.

12. The system according to claim 11, wherein said background intensity is calculated an average value of region of interest (ROI) or a central portion of said image.

13. The system according to claim 12, comprising a step of automatically finding said ROI characterized by a predetermined feature.

14. The system according to claim 8, wherein said step of building a 3D graph of intensity distribution within said image comprises applying a median filter.

15. A non-transitory computer-readable medium storing software comprising instructions executable by one or more computers which, upon such execution, cause the one or more computers to perform operations comprising:
   a. obtaining an image in a digital form;
   b. building a 3D graph of intensity distribution within said image;
   c. calculating identifying vector angle values (IVAVs); said IVAVs adjoin to points of said 3D intensity distribution graph which correspond to individual pixels of said image; said IVAVs lie in a plane defined by an intensity axis of said image;
   d. setting of lower and upper thresh-hold level values (THLV1 and THLV2) between which edge points are indicatable;
   e. indicating edge points according to said THLV1 and THLV2;
   f. establishing edge lines within said image;
   wherein said step of setting said THLV1 and THLV2 comprises setting a plurality of pairs THLV1 and THLV2 differing from each other by a margin increasing with a predetermined increment;
   wherein said step of establishing edge lines within said image further comprises sub-steps of indicating edge points performed for each pair of THLV1 and THLV2 and establishing a plurality of edges line corresponding to said plurality of pairs of THLV1 and THLV2 performed in an individual manner;
   wherein said instructions further comprise establishing a resultant edge line by averaging or maximizing said plurality of edge lines corresponding to said plurality of pairs of THLV1 and THLV2.

16. The non-transitory computer-readable medium according to claim 15, wherein at least one of the following is true:
   a. said non-transitory computer-readable medium comprises a step of comparing said resultant edge line with a standard edge trajectory; and
   b. said step of building a 3D graph of intensity distribution within said image comprises subtracting a background intensity.

17. The non-transitory computer-readable medium according to claim 16, wherein said step of comparing said resultant edge with a standard edge trajectory comprises searching areas of abnormal conditions and automatically image adjustment.

18. The non-transitory computer-readable medium according to claim 16, wherein said background intensity is calculated an average value of region of interest (ROI) or a central portion of said image.

19. The non-transitory computer-readable medium according to claim 18, comprising a step of automatically finding said ROI characterized by a predetermined feature.

20. The non-transitory computer-readable medium according to claim 16, wherein said step of building a 3D graph of intensity distribution within said image comprises applying a median filter.

* * * * *